(12) United States Patent
Jones

(10) Patent No.: US 8,567,811 B1
(45) Date of Patent: Oct. 29, 2013

(54) TRAILER-MOUNTED PLATFORM

(76) Inventor: Garry Jones, West Liberty, OH (US)

( * ) Notice: Subject to any disclaimer, the term of this patent is extended or adjusted under 35 U.S.C. 154(b) by 753 days.

(21) Appl. No.: 12/714,895

(22) Filed: Mar. 1, 2010

Related U.S. Application Data

(60) Provisional application No. 61/208,715, filed on Feb. 27, 2009.

(51) Int. Cl.
B62D 63/06 (2006.01)

(52) U.S. Cl.
USPC .......................................... 280/656; 280/400

(58) Field of Classification Search
USPC ....................................................... 280/656
See application file for complete search history.

(56) References Cited

U.S. PATENT DOCUMENTS

| D149,831 | S | | 6/1948 | Ostrander et al. |
| 3,371,954 | A | * | 3/1968 | Larsson ......................... 296/169 |
| 3,905,596 | A | | 9/1975 | Barber |
| 4,057,284 | A | * | 11/1977 | Blank ........................... 296/169 |
| 4,232,488 | A | | 11/1980 | Hanley |
| 5,078,442 | A | * | 1/1992 | Rau et al. ................... 296/26.02 |
| 5,152,109 | A | * | 10/1992 | Boers ............................. 52/143 |
| 5,193,878 | A | | 3/1993 | Weaver |
| 5,392,718 | A | | 2/1995 | Stevens |
| 5,462,330 | A | * | 10/1995 | Brown .......................... 296/172 |
| 6,017,080 | A | * | 1/2000 | Gill ............................... 296/173 |
| 6,195,943 | B1 | | 3/2001 | Woods et al. |
| 6,283,537 | B1 | * | 9/2001 | DeVore, III ................ 296/182.1 |
| 6,393,769 | B1 | | 5/2002 | Mertik et al. |
| D464,144 | S | | 10/2002 | Peterson |
| 6,739,617 | B1 | * | 5/2004 | Martin .......................... 280/656 |
| 7,159,893 | B2 | * | 1/2007 | Badger et al. ................ 280/656 |
| 7,165,779 | B2 | * | 1/2007 | Badger et al. ................ 280/656 |
| 7,967,369 | B2 | * | 6/2011 | Davidson ..................... 296/173 |
| 2003/0173758 | A1 | * | 9/2003 | Badger et al. ................ 280/656 |
| 2003/0184055 | A1 | * | 10/2003 | Badger et al. ................ 280/656 |

* cited by examiner

Primary Examiner — Jeffrey J Restifo
(74) Attorney, Agent, or Firm — Montgomery Patent & Design; Robert C. Montgomery

(57) ABSTRACT

A trailer-mounted platform that unfolds to provide a multi-purpose platform is herein disclosed, comprising a conventional double axle trailer. A pair of side panels is attached to a longitudinal edge and folded up for transport. In their folded state, the side panels form a triangular shape with a bottom center panel. As such, the interior of the triangular space is used to transport various items associated with the final use of the platform. Upon arrival at its destination, the side panels are lowered and supported with adjustable jack stands along with the center panel to form a platform assembly. The jack stands are adjustable over a wide range to accommodate ground conditions.

16 Claims, 6 Drawing Sheets

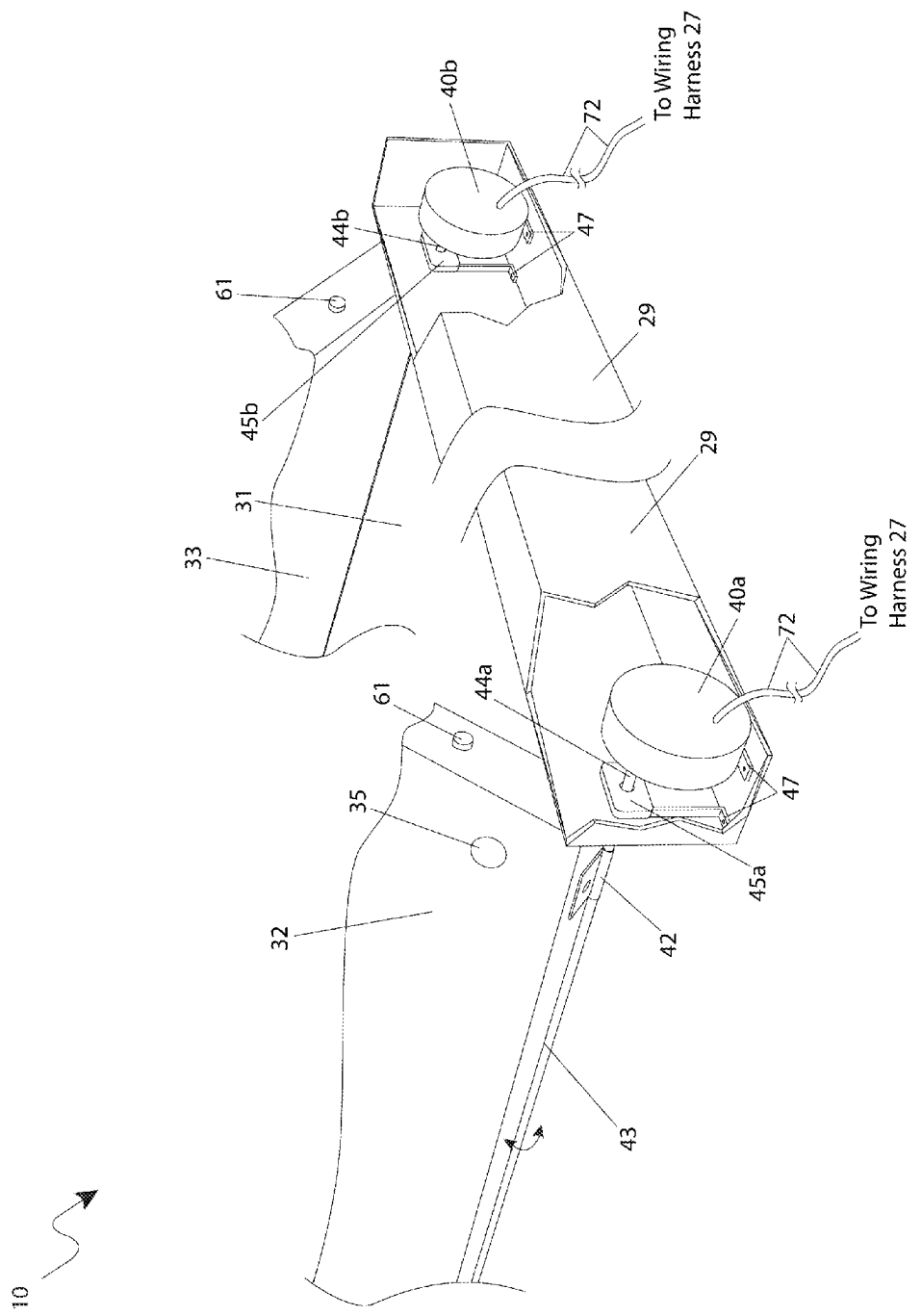

US 8,567,811 B1

TRAILER-MOUNTED PLATFORM

RELATED APPLICATIONS

The present invention was first described in and claims the benefit of U.S. Provisional Application No. 61/208,715, filed Feb. 27, 2009, the entire disclosures of which are incorporated herein by reference.

FIELD OF THE INVENTION

The present invention relates generally to vehicle hitch-mounted trailers, and in particular, to a trailer attachable to a vehicle hitched which is deployable for use as a platform or stage at a desired destination.

BACKGROUND OF THE INVENTION

The use of motor vehicles for transportation and sheltering during outdoor activities such as hunting and camping has expanded to include a great number of features, benefits, and options. Utilizing trailers, recreational vehicles, and the like is popular because of features such as sleeping space, weather protection, power, flat clean surfaces, and mobility.

Due to natural limitations on dimensioning from the width of roads, the width of trailers, recreational vehicles, and the like is limited to sizes of no greater than approximately eight (8) feet. While this is acceptable for many uses, many structures and features which are desirable in an outdoors or camping setting require dimension larger than those which can be provided by such vehicles. As a result, structures such as stages, platforms, and the like which require large surface areas are often transported in pieces which require lengthy setup processes upon arrival or eschewed entirely in favor of simpler but smaller equivalents.

Various attempts have been made to provide portable platforms, stages, and the like. Examples of these attempts can be seen by reference to several U.S. patents. U.S. Pat. No. 4,232,488, issued in the name of Hanley, describes a portable stage. The Hanley apparatus is utilized with a tractor trailer and deploys in a semi-automated fashion via use of hydraulic or pneumatic portions.

U.S. Pat. No. 5,193,878, issued in the name of Weaver, describes a foldable vehicle platform. The Weaver apparatus houses a flat surface underneath a recreational motor vehicle for automatic deployment to a location adjacent the vehicle upon arrival at a destination.

U.S. Pat. No. 6,393,769, issued in the name of Mertik et al., describes a portable stage. The Mertik apparatus includes an integral chassis and deployable canopy to provide conventional features associated with performance stages.

Additionally, ornamental designs for portable platforms and stages exist, particularly U.S. Pat. Nos. D 149,831 and D 464,144. However, none of these designs are similar to the present invention.

While these apparatuses fulfill their respective, particular objectives, each of these references suffer from one (1) or more of the aforementioned disadvantages. Many such apparatuses do not provide a sufficient surface area to be utilized for a wide range of purposes. Also, many such apparatuses do not have a plurality of height adjustment portions in order to adapt to uneven terrain as commonly encountered outdoors. Furthermore, many such apparatuses are not adaptable to be carried by a convention recreational vehicle hitch assembly. In addition, many such apparatuses are not deployable in any desired location regardless of proximity to the vehicle. Finally, many such apparatuses are not of a size and design to be safely and easily utilized by a single user without access to equipment and the like. Accordingly, there exists a need for a trailer mounted platform without the disadvantages as described above. the development of the present invention substantially departs from the conventional solutions and in doing so fulfills this need.

SUMMARY OF THE INVENTION

In view of the foregoing references, the inventor recognized the aforementioned inherent problems and observed that there is a need to provide a portable platform of significant surface area which is transportable by means of conventional vehicle hitches, fully adjustable, and safely deployable by a user with little or no training. Thus, the object of the present invention is to solve the aforementioned disadvantages and provide for this need.

To achieve the above objectives, it is an object of the present invention to comprise a portable platform for being towed by vehicle in order to provide platform capabilities to users in a remote outdoor setting. The apparatus comprises a trailer assembly and a multi-section platform assembly connected to the trailer assembly.

Another object of the present invention is to comprise the trailer assembly of a base, a pair of runners, an A-frame, an A-frame jack stand, a hitch receiver, and first and second wheel pairs. The runners provide cover to the wheels as well as a stepping means for a user.

Yet still another object of the present invention is to comprise the A-frame of a flat, triangular portion which is supported via the A-frame jack stand. During transport, the jack stand may be retracted in order to provide space between the stand and a road surface. The hitch receiver is positioned perpendicular at a distal end of the A-frame and comprises a receiver and attachment means to an existing ball hitch.

Yet still another object of the present invention is to comprise the multi-section platform assembly of a shelf, a center panel, and first and second outer panels. In an un-deployed, folded configuration, the outer panels form a triangular shape with an internal storage area above the center panel. The outer panels are pivotally connected to the center panel.

Yet still another object of the present invention is to comprise a center support which is removably inserted onto the center panel in order to support the first and second outer panels when in a folded state. The support comprises a wedge shaped upper end portion in order to secure engage surface portions of the outer panels.

Yet still another object of the present invention is to comprise a triangular shaped top cover with an open bottom end. The top cover is removably fastened to an apex of the first and second outer panels for transport when in a folded position.

Yet still another object of the present invention is to comprise front and rear covers which are removably attachable to front and rear outside edges of the first and second outer panels in order to provide removable cover for the internal storage area.

Yet still another object of the present invention is to comprise a plurality of adjustable platform jack stands which are removably attachable to a bottom surface of the outer panels when in a horizontal, unfolded position. The platform jack stands provide adjustable vertical support to the outer panels, allowing a user to adapt the panels to uneven terrain and the like.

Yet still another object of the present invention is to comprise a set of steps which is hingedly attached to a rear end of the center panel, thereby providing easy access to the platform when in an unfolded state. During transport, the steps are folded and positioned within the storage area.

Yet still another object of the present invention is to further comprise a control panel, first and second motors, first and second clutch-brakes, first and second torque shafts, first and second drive shafts, and a plurality of offset brackets.

Yet still another object of the present invention is to lift the first and second outer panels via the first and second torque shafts, respectively. The torque shafts rotate within the offset brackets, thereby rotating the panels between the folded and unfolded configurations.

Yet still another object of the present invention is to apply torque to the torque shafts via the first and second motors and first and second clutch-brakes, which are integrally attached to an inner surface of the shelf.

Yet still another object of the present invention is to comprise the control panel of an ON/OFF switch which allows a user to selectively operate the first and second motors.

Yet still another object of the present invention is to provide a method of utilizing the device that provides a unique means of utilizing the apparatus for storage and transport, coupling the apparatus to an existing vehicle tow hitch, transporting the apparatus to a desired location, deploying the outer panels via the integral motors in order to achieve a platform-type structure, utilizing the supports to provide even, stable support to the platform, deploying the stairs, and utilizing the flat, even surface in a desired manner.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| 10 | trailer-mounted platform |
| --- | --- |
| 20 | trailer assembly |
| 21 | base |
| 22 | runner |
| 23 | A-frame |
| 24 | hitch receiver |
| 25a | first wheel |
| 25b | second wheel |
| 26 | A-frame jack stand |
| 27 | wiring harness |
| 28 | rear lighting |
| 29 | shelf |
| 30 | platform assembly |
| 31 | center panel |
| 32 | first outer panel |
| 33 | second outer panel |
| 35 | platform jack stand aperture |
| 36 | platform jack stand |
| 37 | steps |
| 38 | step hinge |
| 39 | storage area |
| 40a | first motor |
| 40b | second motor |
| 42 | offset bracket |
| 43 | first torque shaft |
| 44a | first drive shaft |
| 44b | second drive shaft |
| 45a | first clutch-brake |
| 45b | second clutch-brake |
| 46 | second torque shaft |
| 47 | footing |
| 50 | center support |
| 52 | top cover |
| 53 | front cover |
| 54 | rear cover |
| 60 | first fastener |
| 61 | second fastener |
| 70 | control panel |
| 71 | switch |
| 72 | electrical wiring |

DETAILED DESCRIPTION OF THE PREFERRED EMBODIMENT

The best mode for carrying out the invention is presented in terms of its preferred embodiment, herein depicted within FIGS. 1 through 6. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a trailer-mounted platform (herein described as the "apparatus") 10, which provides a means for foldable multipurpose platform assembly 30 which may be towed behind a vehicle by means of a standard trailer ball hitch.

The apparatus 10 generally comprises a trailer assembly 20 and a multi-section platform assembly 30 which is transported to a desired location and then deployed. A user is able to tow the apparatus 10 to a desired location and deploy the platform assembly 30 to unveil a platform which is utilized for activities such as, but not limited to: camping, hunting, or the like.

Figure 1:
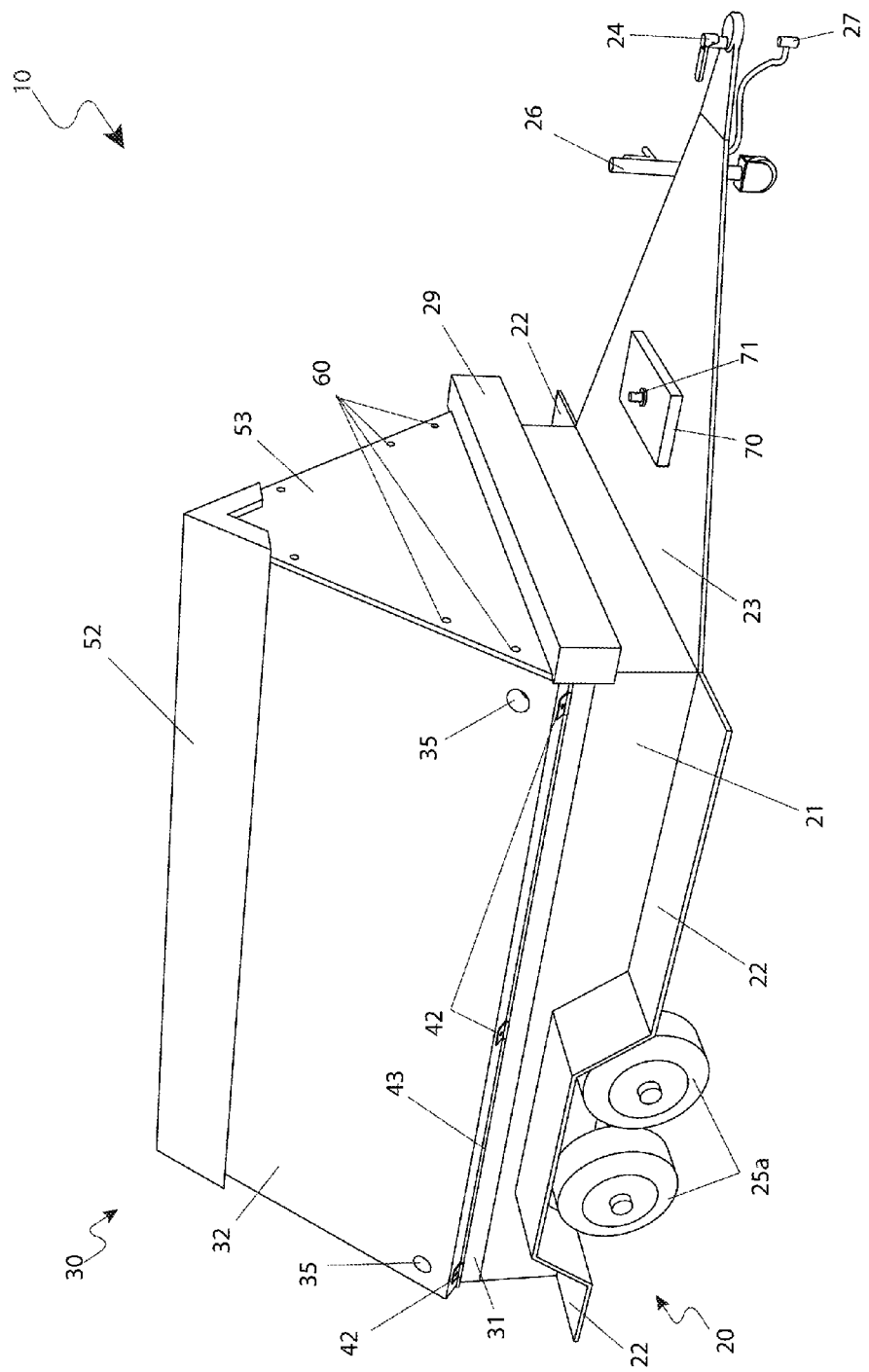
FIG. 1 is a side perspective view of a trailer-mounted platform 10 depicting a towing configuration, according to a preferred embodiment of the present invention.
Figure 2:
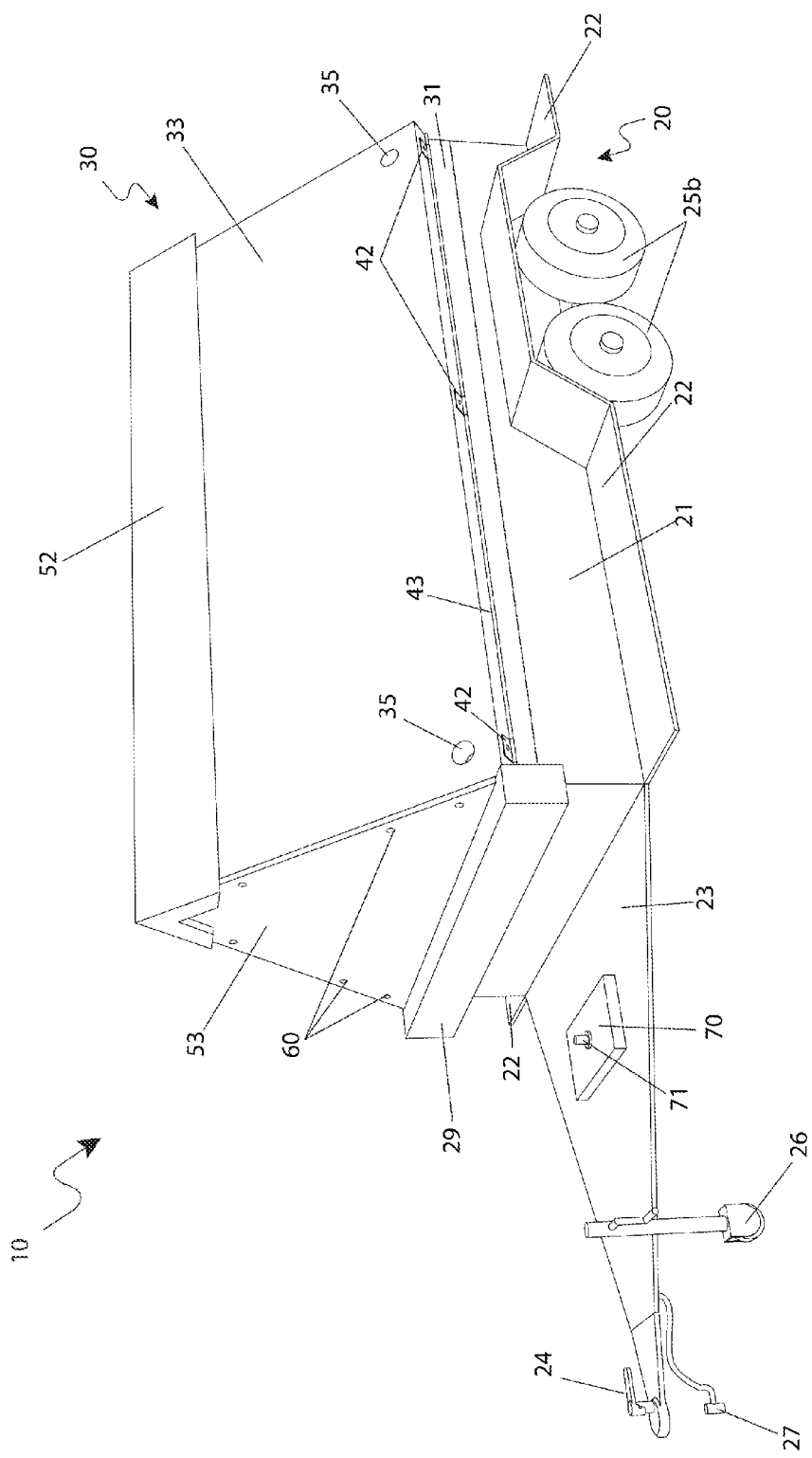
FIG. 2 is an opposing side perspective view of the trailer-mounted platform 10 depicting the towing configuration, according to a preferred embodiment of the present invention.
Figure 3:
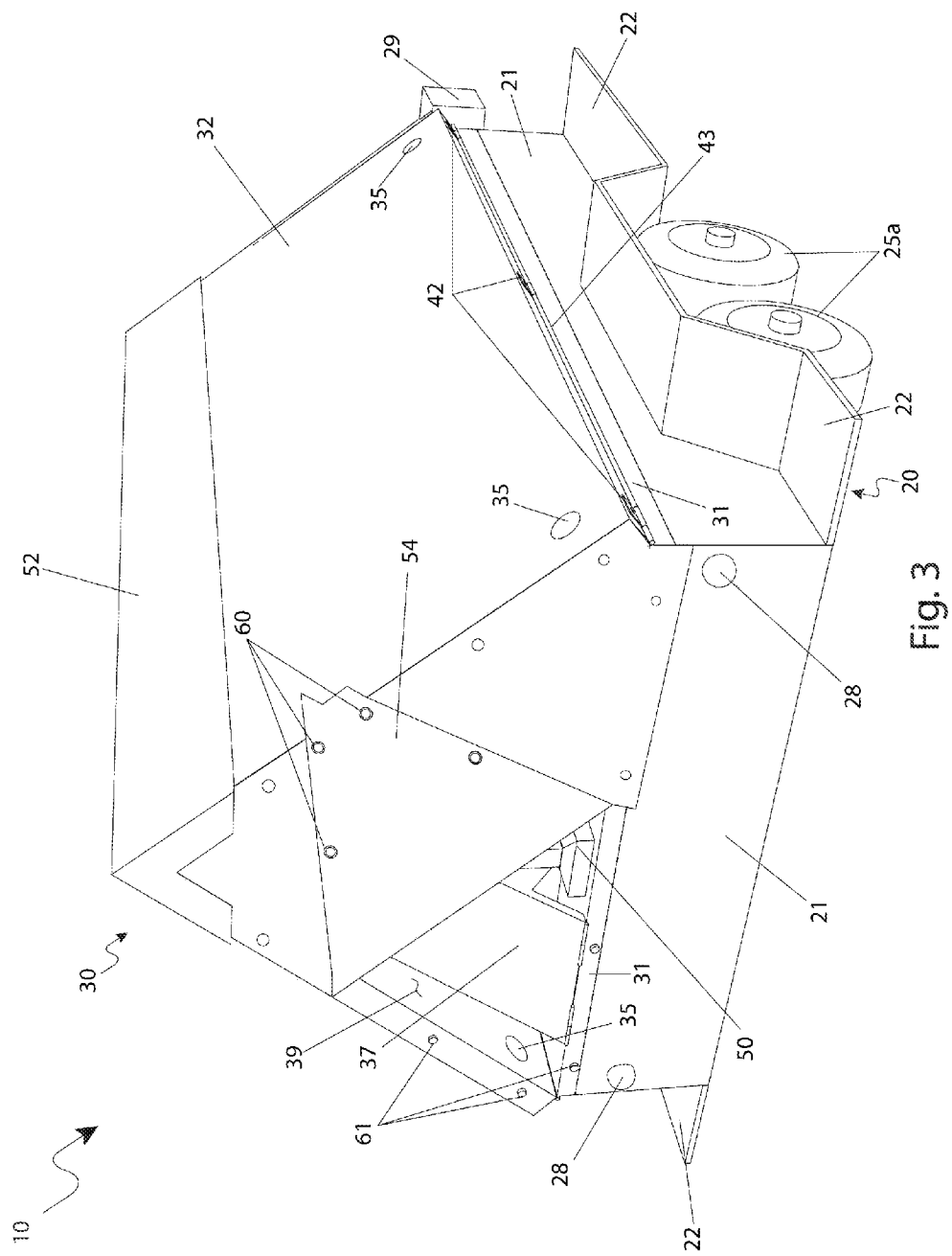
FIG. 3 is a rear perspective view of the trailer-mounted platform 10 depicting the towing configuration, according to a preferred embodiment of the present invention.
Figure 4:
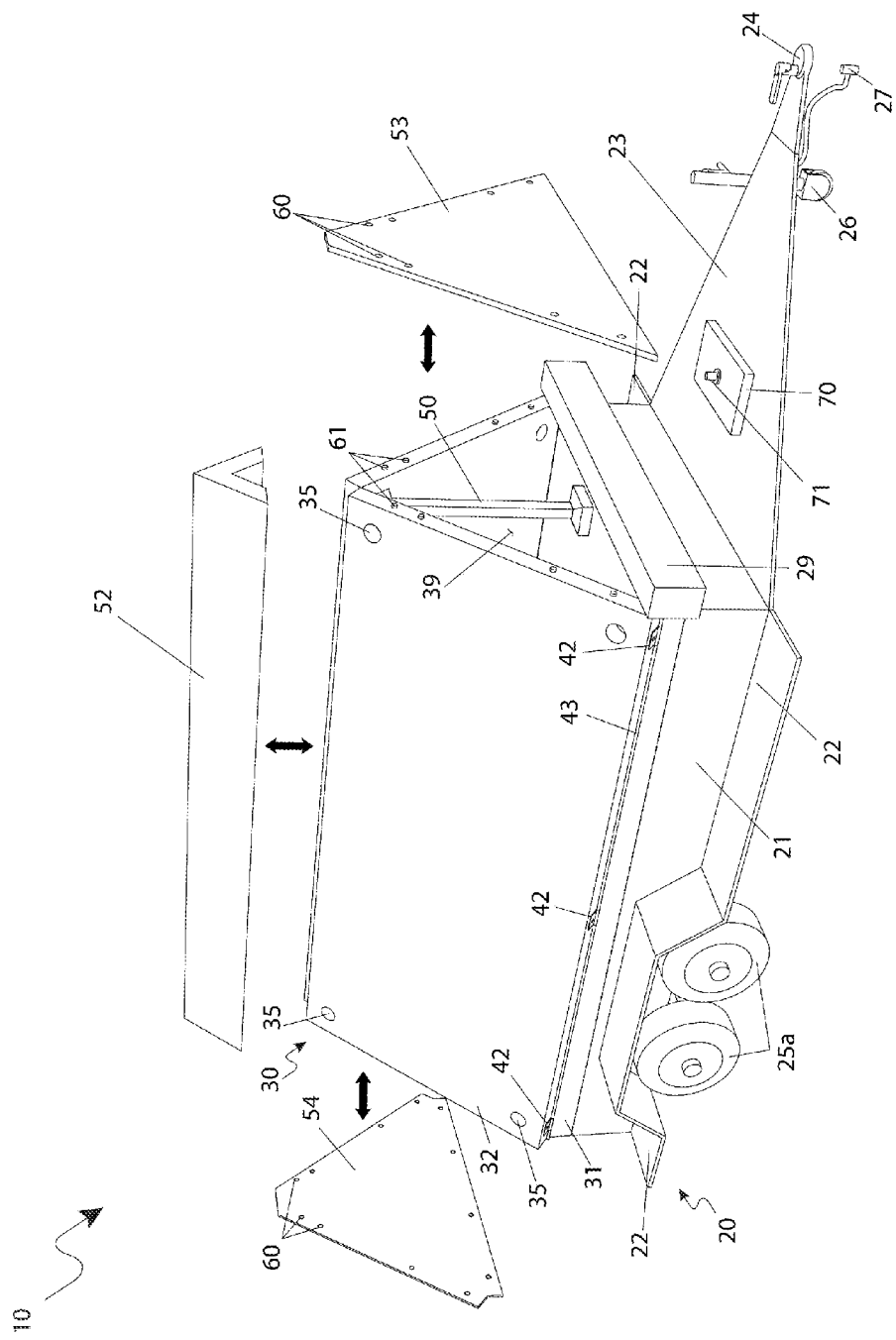
FIG. 4 is a side perspective view of the trailer-mounted platform 10 depicting a folded configuration with the towing features removed, according to a preferred embodiment of the present invention.

Referring now to FIG. 1 through FIG. 4, perspective views of the apparatus 10, according to the preferred embodiment of the present invention, are disclosed. FIG. 1 illustrates a side perspective view of the apparatus 10 depicting a towing configuration, FIG. 2 illustrates an opposing side view of the apparatus 10 depicting a towing configuration, FIG. 3 illustrates a rear perspective view of the apparatus 10 depicting a towing configuration, and FIG. 4 illustrates a side perspective view of the apparatus 10 depicting a folded configuration with the towing features removed. The apparatus 10 comprises three (3) configurations; a first towing configuration (see FIGS. 1 through 3) comprising a towed and traveling configuration, a second folded configuration (see FIG. 4) comprising a transitional configuration, and a third unfolded configuration (see FIG. 5) comprising an in-use configuration. The trailer assembly 20 is preferably made of durable materials such as, but not limited to: wood, metal, thermoplastic, or the like and is manufactured using common techniques and comprises expected features common to other similar towed trailers, such as a base 21, a pair of runners 22, an A-frame 23, a hitch receiver 24, a pair of first wheels 25a, a pair of second wheels 25b, and the like.

The rectangular base 21 provides the main support body thereto the apparatus 10. A runner 22 is located on each outside lower edge of the base 21 which provides an area for a user to step on and provides a cover for a plurality of wheels 25a, 25b. The A-frame 23 extends out therefrom a front surface of the base 21 and comprises a hitch receiver 24 which accepts a standard ball hitch in a conventional manner. The hitch receiver 24 is expected to comprise expects hitch receiving features which enable attachment and a locking means to the standard ball hitch. Positioned perpendicular to the hitch receiver 24 is an A-frame jack stand 26 which enables said hitch receiver 24 to be aligned with the standard ball hitch via height adjustments in a conventional manner. The A-frame jack stand 26 is preferably comprised of a conventional trailer jack attached via nuts and bolts or welding to a side surface of the A-frame 23. The A-frame jack stand 26 also provides front end support thereto the apparatus 10 when extended and provide proper clearance for travel when retracted.

The trailer assembly 20 further comprises a plurality of wheels 25a, 25b, although illustrated here comprising a dual axle configuration it is understood that the apparatus 10 may be introduced with a single axle and as such should not be interpreted as a limiting factor of said apparatus 10. The wheels 25a, 25b enable a transporting means to the apparatus 10, thereby enabling said wheels 25a, 25b to rotate as the towing vehicle tows the apparatus 10 to a desired location. The wheels 25a, 25b are located on lower side portions of the apparatus 10 and are attached to the base 21 via common techniques.

The apparatus 10 further comprises a wiring harness 27 which is similar to other conventional towed vehicle wiring harnesses and provides electrical power therefrom the towing vehicle thereto various components of said apparatus 10, such as rear lighting 28, a first motor 40a, a second motor 40b, and the like. The wiring harness 27 connection means is located beneath the hitch receiver 24 to provide an easy connection to the towing vehicle.

The apparatus 10 further comprises a pair of conventional rear lighting 28 means which are preferably brake lights, turn signals, and the like. The lighting 28 is located on a rear surface of the base 21 (see FIG. 3) which increases the conspicuous of the apparatus 10 to other vehicles on the road whom need to recognize the signaling actions the towing vehicle. The lighting 28 is attached to said base 21 via common techniques such as, but not limited to: screws, welding, or the like.

The platform assembly 30 comprises a shelf 29, a center panel 31, a first outer panel 32, and a second outer panel 33. The platform assembly 30 is preferably made of a durable, rigid material such as wood, metal, thermoplastic, or the like and be manufactured and constructed using common techniques. In the folded configuration the apparatus 10 is approximately sixteen (16) feet long by eight (8) feet wide and comprises a generally triangular shape and an internal storage area 39 (see FIGS. 3 and 4). The center panel 31 is permanently attached thereto an upper surface of the base 21 via mechanical fasteners, welding, or the like. The first outer panel 32 and second outer panel 33 are each approximately sixteen (16) feet long by six (6) feet wide and fold upwardly, thus forming the triangular base.

The apparatus 10 further comprises a pair of center supports 50 which are removably inserted onto the center panel 31 and provide a support member thereto the outer panels 32, 33 when in the folded configuration. The center support 50 is a cylindrical member comprising support flanges therearound a lower end which rest thereon an upper surface of the center panel 31 and a wedge-shaped upper end which the outer panels 32, 33 rest thereon. A center support 50 is inserted on a front and a rear portion of the apparatus 10 and are inserted before towing and removed before deploying the outer panels 32, 33.

The apparatus 10 further comprises a triangular-shaped top cover 52 comprising open bottom ends which mate with the longitudinal upper end portions of the outer panels 32, 33. The top cover 52 is preferably made of a thermoplastic or the like and manufactured using common techniques. The top cover 52 is removably fastened and conceals an apex of the triangular-shaped, upwardly folded outer panels 32, 33 and protects the storage area 39 from weather. The storage area 39 stows any equipment or other articles the user desires to transport and use with the apparatus 10 when in the unfolded configuration.

The apparatus 10 further comprises a front cover 53 and a rear cover 54 which are preferably made of a weather-resistant textile and comprises a generally triangular shape. The front cover 53 is removably fastened thereto a front outside edge of the outer panels 32, 33 above a shelf 29 (see herein below) via a plurality of first fasteners 60 and a plurality of second fasteners 61 which cover and protect the storage area 39 from the weather during transit or storage when in the folded configuration. The rear cover 54 is removably attached thereto a rear outside edge of the outer panels 32, 33 via a plurality of fasteners 60, 61 which covers and protects the storage area from the weather during transit or storage when in the folded configuration. The fasteners 60, 61 are preferably mechanical fasteners such as snaps, hooks, or the like with a first side 60 located thereon the covers 53, 54 and a second corresponding side 61 located thereon the respective components of the platform assembly 30.

The apparatus 10 further comprises a rectangular shelf 29 which provides a secure enclosure for a first motor 40a, a second motor 40b, a first clutch-brake 45a, and a second clutch-brake 45b (see FIG. 6). The shelf 29 is attached to and protrudes outwardly from a front surface of the base 21 above the A-frame 23 via attachment means such as, but not limited to: welding, integral molding, or the like.

Figure 5:
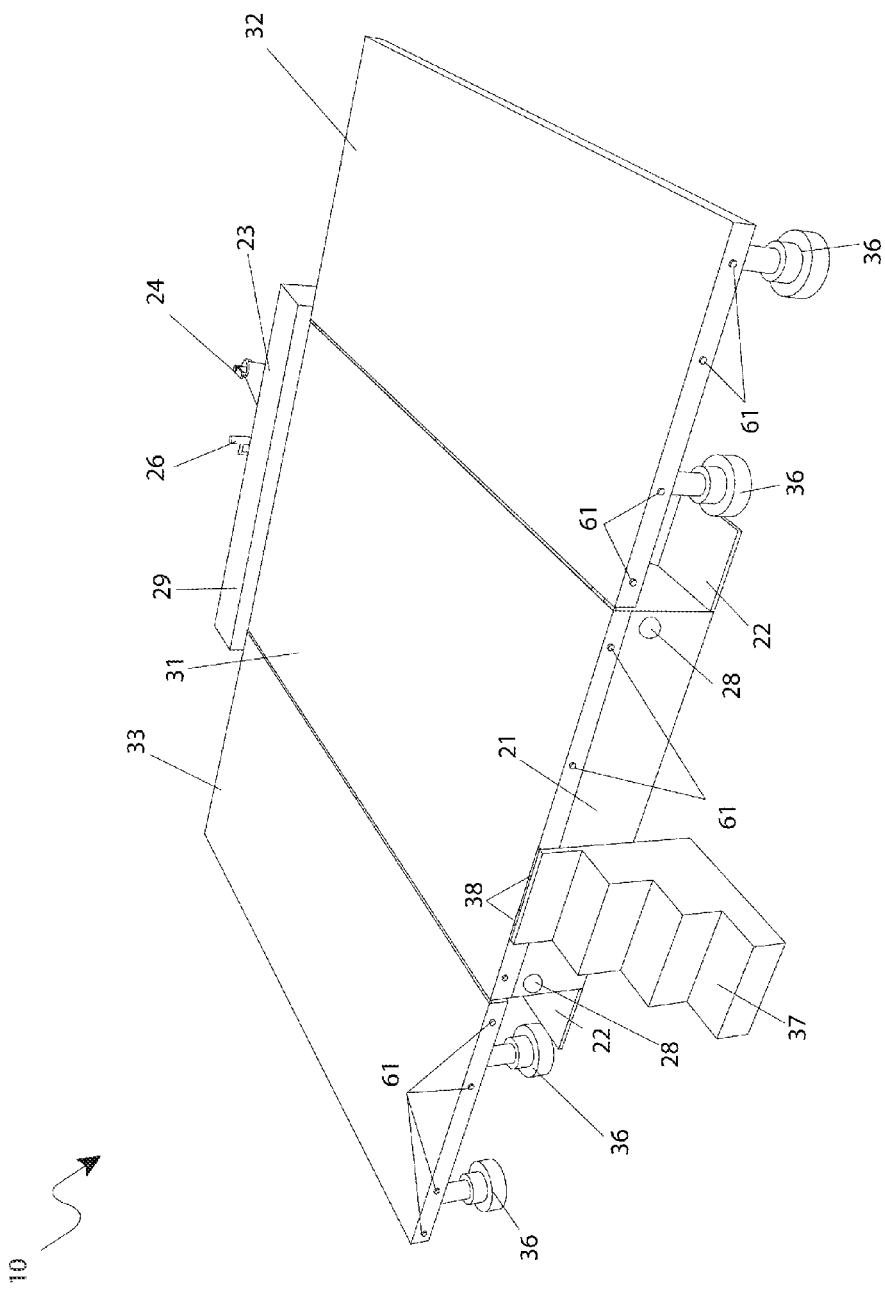
FIG. 5 is a rear perspective view of the trailer-mounted platform 10 depicting an unfolded configuration, according to a preferred embodiment of the present invention; and, FIG. 6 is a front perspective view of the trailer-mounted platform 10 depicting internal components of a shelf 29, according to a preferred embodiment of the present invention.

Referring now to FIG. 5, a rear perspective view of the apparatus 10 in an unfolded configuration, according to the preferred embodiment of the present invention, is disclosed. In the unfolded configuration the outer panels 32, 33 are horizontally deployed via a motor 40 and other associated mechanical components (see FIG. 6) via pivoting about a panel hinge 29 to become level with the center panel 31, thus providing a large level platform which is used as an outdoor living area where a tent, a cooking area, or the like may be set up. The panel hinge 29 is located between each outer panel 32, 33 and the center panel 31 and is preferably comprised of a conventional piano hinge, yet other pivoting devices may be utilized without limiting the scope of the invention. Once unfolded, the outer panels 32, 33 are supported by a plurality of adjustable platform jack stands 36. The platform jack stands 36 are removably attached via a friction fitting means thereto an underneath surface of each outer panel 32, 33 thereat a platform jack stand aperture 35 (see FIGS. 1 through 4 and 6). Each outer panel 32, 33 comprises up to four (4) platform jack stand apertures 35 for insertion of a corresponding platform jack stand 36. In use, with the outer panels 32, 33 deployed, the user inserts a platform jack stand 36 into a platform jack stand aperture 35, thereby enabling said platform jack stand 36 to support the respective outer panel 32, 33.

The apparatus 10 further comprises a set of steps 37 which are hingedly attached thereto a rear end of the center panel 31. The steps 37 comprise a low profile design which will enable said steps 37 to be folded up and positioned thereon the center panel 31 for storage therewithin the storage area 39 when not in use while not interfering with the upwardly folded position of the outer panels 32, 33. In a folded down position the steps 37 assist a user in accessing the platform assembly 30 surface and in the loading and unloading of articles therefrom. The steps 37 are hingedly attached to the center panel 31 via step hinges 38 which are comprised of conventional hinging devices such as, but not limited to: piano hinges, barrel hinge, or the like.

Referring now to FIG. 6, a front perspective view of the apparatus 10 depicting internal components of a shelf 29, according to the preferred embodiment of the present invention, is disclosed. It is known that the FIG. 6 is illustrated without the A-frame 23 and associated components for illustration purposes only. The apparatus 10 comprises a first motor 40a, a second motor 40b, a plurality of offset brackets 42, a first torque shaft 43, a first drive shaft 44a, a second drive shaft 44b, a first clutch-brake 45a, a second clutch-brake 45b, and a second torque shaft 46. The torque shafts 43, 46 drive coincidental lifting of the first outer panel 32 and the second outer panel 33, respectively. Although the lifting means of the outer panels 32, 33 are illustrated with the abovementioned components it is known that other means may be utilized without limiting the scope of the invention.

Each motor 40a, 40b is preferably a common direct current (DC) electric motor mounted via common footings 47 to an inside surface of the shelf 29. Each motor 40a, 40b is further powered by the towing vehicle via electrical wiring 72 interconnected to the wiring harness 27. A first clutch 45a is connected to the first motor 40a via a first drive shaft 44a and a second clutch 45b is connected to the second motor 40b via a second drive shaft 44b. Each clutch-brake 45a, 45b is preferably a commercially available electric clutch-brake which maintains a direct drive function when receiving a 12-Volt signal. Upon removal of said 12-Volt signal the clutch-brakes 45a, 45b are disengaged, thereby allowing manual manipulation of the respective outer panels 32, 33 especially helpful in an event such as a motor failure or depleted primary power source. The first clutch 45a is connected to a first torque shaft 43 which is further attached to the first outer panel 32 via a plurality of offset brackets 42. Similarly, the second clutch 45b is connected to a second torque shaft 46 which is further attached to the second outer panel 33 via the offset brackets 42. The offset brackets 42 enable the inserted torque shafts 43, 46 to rotate within said offset brackets 42, thereby rotating the outer panels 32, 33, respectively. Each clutch 45a, 45b is also illustrated herein as being attached to an inner surface of the shelf 29 via common footings 47, yet other means of attachment may be utilized without limiting the scope of the apparatus 10. Torque is applied to each torque shaft 43, 46 via a rotational direction of the corresponding motors 40a, 40b and respective clutch-brakes 45a, 45b.

Each motor 40a, 40b is initiated via a control panel 70 which is integrally molded to an upper surface of the A-frame 23 (see FIG. 4) which provides an accessible digit-operated switching means. The control panel 70 comprises a switch 71, internal circuitry, and electrical wiring 72. The electrical wiring interconnects said control panel 70 to the motors 40a, 40b. With the apparatus 10 in a desired location, the user preferably depresses the switch 71 to send a signal through the electrical wiring 72 to initiate up to three (3) arrangements. The switch 71 preferably enables the user to turn the motors 40a, 40b to an on position, to a lift position, or to an off position. With the switch 71 in an off position, no power is being sent to the motors 40a, 40b which enables a user to manually retract or lift the outer panels 32, 33. With the switch 71 in the on position, power is sent to the motors 40a, 40b and the clutch-brakes 45a, 45b are engaged. With the switch 71 in the lift position, the outer panels 32, 33 are enabled to be lowered or raised via the rotation of the motors 40a, 40b on the torque shafts 43, 46, respectively. The switch 71 is preferably a common toggle switch, yet other electrical switching devices may be utilized without limiting the scope of the apparatus 10.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIGS. 1 through 6.

The method of utilizing the apparatus 10 may be achieved by performing the following steps: acquiring the apparatus 10; beginning with the apparatus 10 in the folded configuration; connecting the hitch receiver 24 thereto the ball hitch of a towed vehicle; connecting the wiring harness 27 in a common manner to the electrical system of the towed vehicle; towing the apparatus 10 thereto a desired location; removing the top cover 52 therefrom the apex of the folded outer panels 32, 33 via lifting upwardly thereupon said cover 52; removing the front cover 53 and rear cover 54 therefrom the folded outer panels 32, 33 via disengaging the first fasteners 60 with the second fasteners 61; engaging the A-frame jack stand 26 until the lower end is in contact therewith the ground; activating the motors 40a, 40b and corresponding clutch-brakes 45a, 45b via positioning the switch 71 to an on position thereon the control panel 70; lowering the outer panels 32, 33 into an unfolded configuration via depressing the switch 71 to a lift position thereon the control panel 70; attaching the platform jack stands 36 to the platform jack stand apertures 35 via inserting said platform jack stands 36 into the platform jack stand apertures 35 via friction fitting means; adjusting the platform jack stands 36 to an appropriate length such that the lower ends of each said jack stand 36 are in contact therewith the ground; disconnecting the wiring harness 27 and hitch receiver 24; removing the center support 50 from the storage area 39; storing the covers 52, 53, 54 and center supports 50; utilizing the now level platform panels 31, 32, 33 as a living surface for a tent, grilling and cooking stand, and the like; returning the apparatus 10 thereto the folded configuration when done utilizing said apparatus 10 via depressing the switch 71; utilizing the storage area 39 to store any equipment and articles; attaching the covers 52, 53, 54; towing the apparatus 10 back thereto a desired location.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A trailer-mounted platform for being towed behind a vehicle, said trailer-mounted platform comprising:
    a trailer assembly; and,
    a multi-section platform assembly connected to said trailer assembly, said multi-section platform assembly comprising:
        a shelf attached to said base and protruding outwardly above said trailer assembly;
        a center panel attached to said shelf and attached to said base respectively;
        first and second outer panels pivotally connected to said center panel thereby forming a generally triangular internal storage area above said center panel;
    a control panel including a switch selectively toggled between on and off configurations;
    first and second motors located inside said shelf and coupled to said control panel;
    first and second clutch-brakes located inside said shelf;
    a first torque shaft connected said first clutch-brake and attached to said first outer panel;
    a second torque shaft connected to said second clutch-brake and attached to said second outer panel;
    first and second drive shafts connected to said first and second motors respectively; and,
    a plurality of offset brackets connected to said first and second drive shafts respectively;
    wherein said first clutch-brake is connected to said first motor via said first drive shaft;
    wherein second clutch-brake is connected to said second motor via a second drive shaft;
    wherein said first and second clutch-brakes are engaged when said switch is at the on configuration; and,
    wherein said first and second outer panels are selectively articulated between folded and unfolded configurations, said first and second outer panels being horizontally oriented within with said center panel when biased to the unfolded configuration.

2. The trailer-mounted platform of claim 1, wherein said trailer assembly comprises:
    a base;
    a pair of runners located on outside lower edges of said base;
    an A-frame extending out from a front surface of said base;
    an A-frame jack stand attached to a side surface of said A-frame;
    a hitch receiver positioned perpendicular to said A-frame and adapted to be connected to an existing ball hitch; and,
    a first and second wheel pairs located on lower side portions of said runners.

3. The trailer-mounted platform of claim 1, further comprising: a center support removably inserted onto said center panel and thereby supporting said first and second outer panels at the folded configuration, said center support resting on an upper surface of said center panel and having wedge-shaped upper ends connected to said first and second outer panels.

4. The trailer-mounted platform of claim 1, further comprising: a triangular-shaped top cover having open bottom ends mated with longitudinal upper end portions of said first and second outer panels, said top cover being removably fastened to an apex of said first and second outer panels.

5. The trailer-mounted platform of claim 1, further comprising:
    a front cover removably attached to a front outside edge of said first and second outer panels and located above said shelf; and,
    a rear cover removably attached to a rear outside edge of said first and second outer panels.

6. The trailer-mounted platform of claim 1, further comprising:
    a plurality of adjustable platform jack stands removably attached to an underneath surface of said first and second outer panels respectively; when biased to the unfolded configuration, said first and second outer panels being supported by said platform jack stands; and,
    a set of steps hingedly attached to a rear end of said center panel and thereby folded up and positioned on said center panel for storage within said storage area.

7. The trailer-mounted platform of claim 1, wherein said first and second torque shafts lift said first and second outer panels respectively; wherein said first and second torque shafts rotate within said offset brackets and thereby rotate said first and second outer panels between the unfolded and folded configurations respectively.

8. The trailer-mounted platform of claim 1, wherein said first and second clutch-brakes are attached to an inner surface of said shelf; wherein torque is applied to said first and second torque shaft via rotation of said first and second motors and said first and second clutch-brakes respectively.

9. A trailer-mounted platform for being towed behind a vehicle, said trailer-mounted platform comprising:
    a trailer assembly;
    a multi-section platform assembly connected to a top of said trailer assembly, said multi-section platform assembly comprising:
        a shelf attached to a front surface of said base and protruding outwardly above said trailer assembly;
        a center panel attached to said shelf and permanently attached to an upper surface of said base respectively; and,
        first and second outer panels pivotally connected to said center panel thereby forming a generally triangular internal storage area above said center panel;
    a control panel including a switch selectively toggled between on and off configurations;
    first and second motors located inside said shelf and coupled to said control panel;
    first and second clutch-brakes located inside said shelf;
    a first torque shaft connected said first clutch-brake and attached to said first outer panel;

a second torque shaft connected to said second clutch-brake and attached to said second outer panel;

first and second drive shafts connected to said first and second motors respectively; and, a plurality of offset brackets connected to said first and second drive shafts respectively;

wherein said first clutch-brake is connected to said first motor via said first drive shaft;

wherein second clutch-brake is connected to said second motor via a second drive shaft;

wherein said first and second clutch-brakes are engaged when said switch is at the on configuration; and, wherein said first and second outer panels are selectively articulated between folded and unfolded configurations, said first and second outer panels being horizontally oriented within with said center panel when biased to the unfolded configuration.

10. The trailer-mounted platform of claim 9, wherein said trailer assembly comprises:

a base;

a pair of runners located on outside lower edges of said base;

an A-frame extending out from a front surface of said base;

an A-frame jack stand attached to a side surface of said A-frame;

a hitch receiver positioned perpendicular to said A-frame and adapted to be connected to an existing ball hitch; and, a first and second wheel pairs located on lower side portions of said runners.

11. The trailer-mounted platform of claim 9, further comprising: a center support removably inserted onto said center panel and thereby supporting said first and second outer panels at the folded configuration, said center support resting on an upper surface of said center panel and having wedge-shaped upper ends connected to said first and second outer panels.

12. The trailer-mounted platform of claim 9, further comprising: a triangular-shaped top cover having open bottom ends mated with longitudinal upper end portions of said first and second outer panels, said top cover being removably fastened to an apex of said first and second outer panels.

13. The trailer-mounted platform of claim 9, further comprising:

a front cover removably attached to a front outside edge of said first and second outer panels and located above said shelf; and, a rear cover removably attached to a rear outside edge of said first and second outer panels.

14. The trailer-mounted platform of claim 9, further comprising:

a plurality of adjustable platform jack stands removably attached to an underneath surface of said first and second outer panels respectively; when biased to the unfolded configuration, said first and second outer panels being supported by said platform jack stands; and, a set of steps hingedly attached to a rear end of said center panel and thereby folded up and positioned on said center panel for storage within said storage area.

15. The trailer-mounted platform of claim 9, wherein said first and second torque shafts lift said first and second outer panels respectively; wherein said first and second torque shafts rotate within said offset brackets and thereby rotate said first and second outer panels between the unfolded and folded configurations respectively.

16. The trailer-mounted platform of claim 9, wherein said first and second clutch-brakes are attached to an inner surface of said shelf; wherein torque is applied to said first and second torque shaft via rotation of said first and second motors and said first and second clutch-brakes respectively.

* * * * *